United States Patent [19]

Giner et al.

[11] 4,192,910

[45] Mar. 11, 1980

[54] CATALYST SURFACES FOR THE CHROMOUS/CHROMIC REDOX COUPLE

[76] Inventors: Robert A. Frosch, Administrator of the National Aeronautics and Space Administration, with respect to an invention of Jose D. Giner; Kathleen J. Cahill, both of Waltham, Mass.

[21] Appl. No.: 964,754

[22] Filed: Nov. 29, 1978

[51] Int. Cl.$^2$ .............................................. H01M 8/18
[52] U.S. Cl. .................................. 429/101; 429/105; 429/107; 429/109
[58] Field of Search ............... 429/105, 101, 107, 109, 429/19, 46, 34, 17, 27; 204/2.1, 53, 43

[56] References Cited

U.S. PATENT DOCUMENTS

| | | | |
|---|---|---|---|
| 3,178,315 | 4/1965 | Worsham | 429/46 X |
| 3,279,949 | 10/1966 | Schaefer et al. | 429/46 X |
| 3,996,064 | 12/1976 | Thaller | 429/34 X |

*Primary Examiner*—Anthony Skapars

*Attorney, Agent, or Firm*—N. T. Musial; J. R. Manning; J. A. Mackin

[57] ABSTRACT

There is disclosed an electricity producing cell of the reduction-oxidation (REDOX) type divided into two compartments by a membrane, each compartment containing a solid inert electrode. A ferrous/ferric couple in a chloride solution serves as a cathode fluid which is circulated through one of the compartments to produce a positive electric potential disposed therein. A chromic/chromous couple in a chloride solution serves as an anode fluid which is circulated through the second compartment to produce a negative potential on an electrode disposed therein. The electrode is an electrically conductive, inert material plated with copper, silver or gold. A thin layer of lead plates onto the copper, silver or gold layer when the cell is being charged, the lead ions being available from lead chloride which has been added to the anode fluid. If the REDOX cell is then discharged, the current flows between the electrodes causing the lead to deplate from the negative electrode and the metal coating on the electrode will act as a catalyst to cause increased current density.

14 Claims, 4 Drawing Figures

CATALYST SURFACES FOR THE CHROMOUS/CHROMIC REDOX COUPLE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

Because of the energy crisis beginning in the mid-1970's and due to economic factors within the electric utility industry, there is a need for storing bulk quantities of electrical power which might be produced intermittently or randomly by devices such as wind-driven generators, solar cells or the like. A number of methods have been considered including the storage of compressed air in large reservoirs, flywheels, capacitive storage, inductive storage and a number of electric chemical schemes. Electrochemical storage batteries are generally expensive, heavy and subject to deterioration when subjected to repeated charge and discharge actions.

Up until now, only pumped water storage wherein water from a water storage pond at one level is directed to a water storage pond at a lower level through a hydro-electric plant having a water pumping capability has proven to be a viable method. Unfortunately, such facilities are limited to areas where the terrain is suitable for providing water sources at different elevations.

Electrically rechargeable REDOX flow cell systems are well known and have a very high overall energy efficiency as compared to other systems. Furthermore, REDOX type cells can be discharged more completely than secondary battery systems. Additionally, REDOX cells are inexpensive as compared to secondary batteries and do not deteriorate as significantly when repeatedly discharged in recharge.

DESCRIPTION OF THE PRIOR ART

As indicated previously, REDOX electrical cells are well-known. One of the best known REDOX cells uses an anode fluid having a chromic/chromous couple and a cathode fluid having ferrous/ferric couple. In the prior art, electric potential from such a REDOX cell was obtained by terminals connected to respective inert electrodes, one being disposed in the anode fluid and the other being disposed in the cathode fluid. Carbon and graphite products which are inert to the anode and cathode fluids were used as electrodes in some cases.

OBJECTIVES AND SUMMARY OF THE INVENTION

It is an object of the invention to provide a REDOX cell which will deliver much greater current for any given electrode surface area than prior art devices.

It is another object of the invention to provide a REDOX type cell which will deliver an increasingly greater percentage of current when compared to prior art REDOX cells as the cell approaches a discharged condition.

Still another object of the invention is to provide a method of making a REDOX cell wherein certain desirable ions are provided in one of the fluids to produce a coating on its associated electrode as the REDOX cell is charged.

Yet another object of the invention is to provide a REDOX cell having a catalytic coating on one of the electrodes to enhance the activity of the desired ions in the one fluid.

In summary, there is provided a REDOX cell which may or may not have a catalytic coating on one electrode but including certain desired ions in the fluid which contacts the electrode to coat it with the ions as charging takes place.

DESCRIPTION OF A PREFERRED EMBODIMENT

Figure 1:
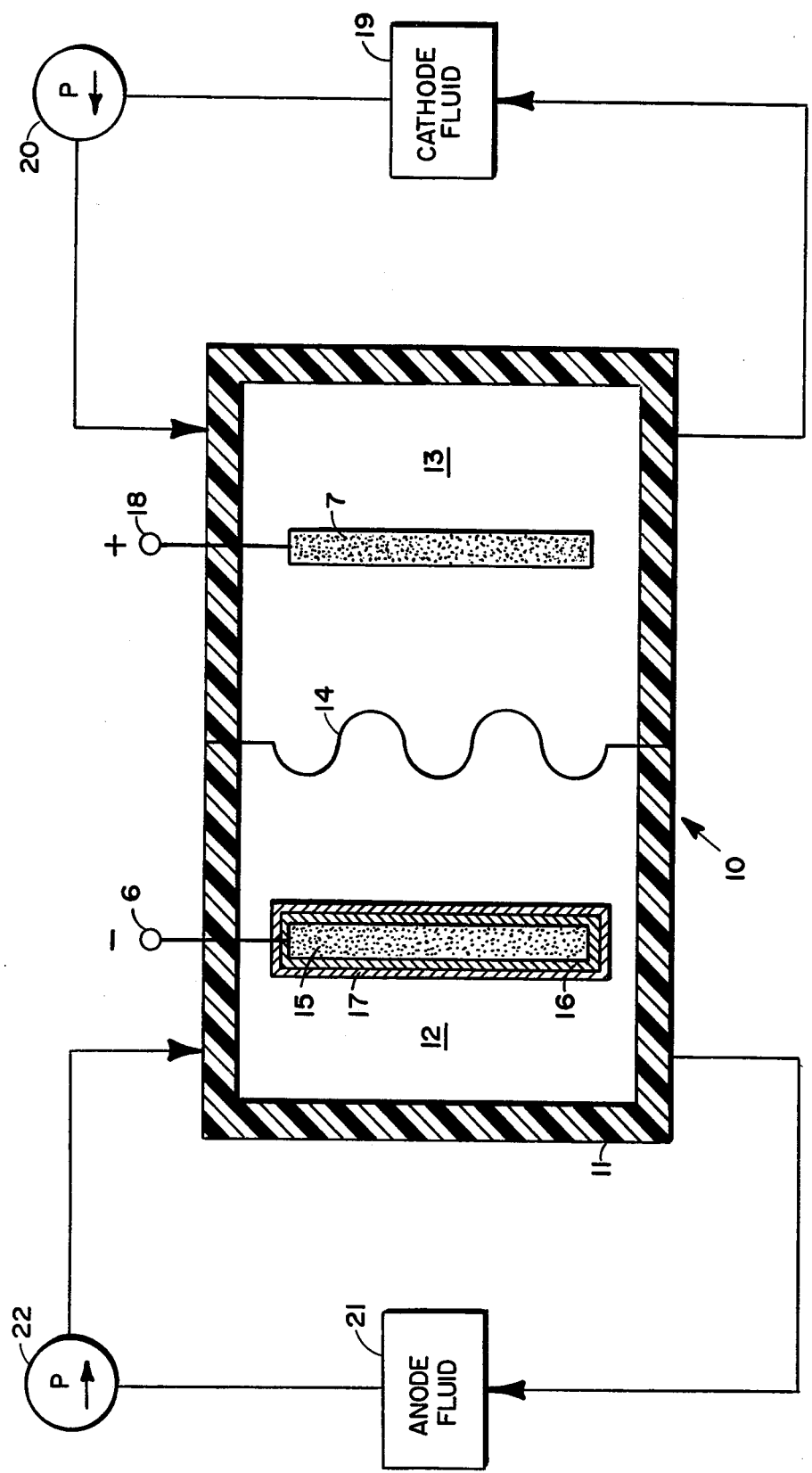
FIG. 1 is a cross-sectional view of the REDOX cell embodying the invention showing the anode and cathode fluid supply systems schematically.

Referring now to FIG. 1, there is shown a REDOX cell 10 comprising container 11, divided into compartments 12 and 13 by an ion conductive membrane 14. The graphite electrode 15 is disposed in the chamber 12 and connected to an output terminal 6 while a graphite electrode 17 is disposed in compartment 13 and connected to an output terminal 18.

In order to produce a voltage or potential difference between terminals 6 and 18, a cathode fluid is passed through chamber 13 while an anode fluid is passed through chamber 12. As shown, cathode fluid from a cathode fluid source 19 is circulated by a pump 30 through compartment 13. Similarly, anode fluid from an anode fluid source 21 is circulated by a pump 22 through the compartment 13.

The REDOX cell 10 utilizes an iron/chromium system wherein the cathode fluid contains ferrous/ferric couple while the anode fluid contains a chromic/chromous couple. The anode fluid preferably contains water and HCl (aqueous solution of HCl) having dissolved therein a chromium chloride salt. The cathode fluid likewise is water and HCl but has dissolved therein an iron chloride salt. These fluids provide the desired couples in each of the chambers 11 and 12. A more complete discussion of the couple, the fluid electrode requirements and membrane considerations is given in U.S. Pat. No. 3,996,064 which is incorporated herein by reference. In accordance with the present invention, it has been found that a coating of lead on the inert electrode 15 substantially increases the current density of the electrode, and consequently, the current available at terminals 6 and 18. The lead may be coated onto the electrode 15 before it is disposed in chamber 12 to be contacted by the circulating anode with fluid. It can also be obtained by dissolving lead chloride in the anode fluid before charging the REDOX cell.

When current is supplied to the REDOX cell 10 at terminals 6 and 18 to bring it up to a charged condition, a lead coating will deposit on the anode electroce 15. Conversely, as the REDOX cell is discharged by current drawn from the terminals 6 and 18, the lead deplates from the electrode and is redissolved into the anode fluid.

When the REDOX cell is being charged, chromium reduction occurs very rapidly on the lead surface which is desirable for high current density. At the same time, the rate of hydrogen evolution is advantageously minimized. On a lead surface which was prepared by the electrode position of a very thin layer of lead onto a smooth carbon rod, the reduction current was measured to be 12 ma/cm$^2$ at an electrode potential of $-600$ millivolts (mv) versus a standard calomel electrode (SCE). Under like conditions, the reduction current for an untreated electrode was only 0.2 ma/cm$^2$. Thus, the lead coating on a carbon rod provided a 60-fold increase of reduction current.

Figure 2:
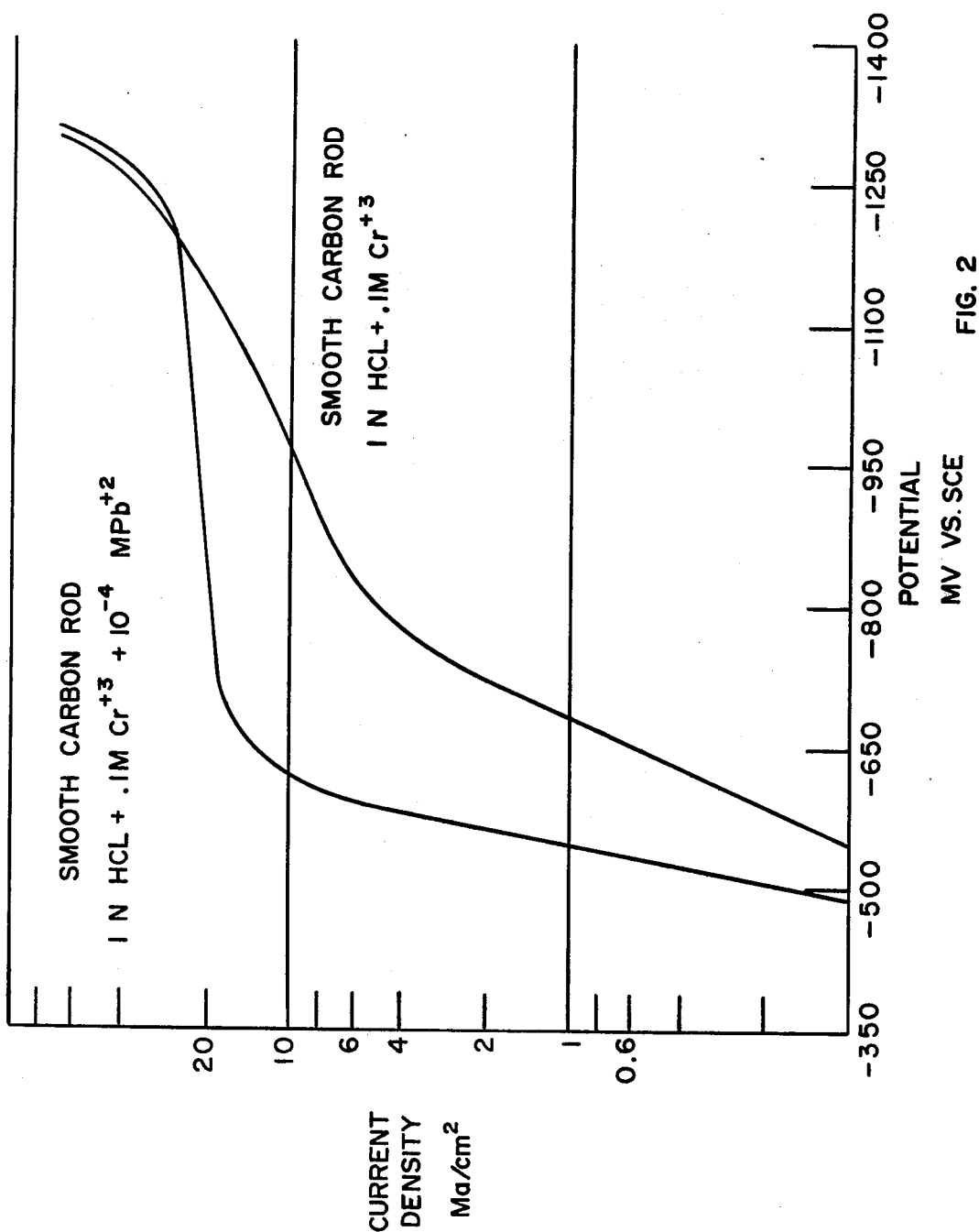
FIG. 2 is a graph illustrating the increased current density in a REDOX cell embodying the invention.

Referring now to FIG. 2, there is shown graphically the relative performance obtained over a wide range of polarizations of a solution that contained no lead ions and one that contained $10^{-4}$ molar of lead ions.

Lead is representative of a class of non-noble metals that possess a very high hydrogen overvoltage and yet provides surfaces on which chromic ion reduction is very rapid. Because lead is subject to anodic dissolution, it is plated onto the porous carbon or graphite electrode structure during the recharging mode of the chromous/chromic reaction. Lead chloride is soluble in these acidified chloride solutions and thus remains in solution during the discharge mode of operations within a REDOX system. When the REDOX cell is being charged, the lead is plated out of the solution and back onto the carbon or graphite electrode structure.

When the REDOX cell is being discharged, the lead functions very well as a surface for the reversible electrochemical oxidation of the chromous ions to chromic ions. However, each time the REDOX cell is discharged, the lead undergoes electrochemical oxidation and is deplated from the anode surface and the activity for electrochemical oxidation of chromous ion will then depend on the activity of the electrode structure itself. It has been found the carbon and graphite material are not very active for this reaction.

Figure 3:
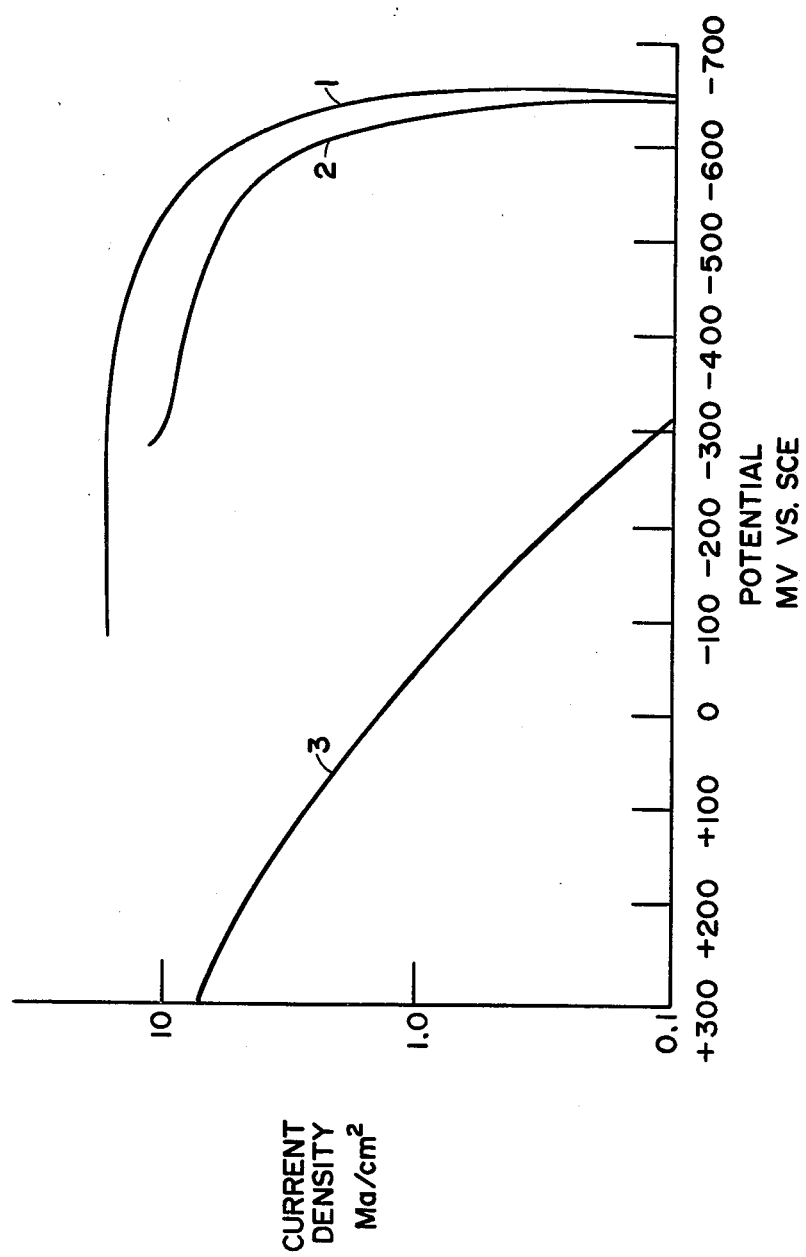
FIG. 3 is a graph illustrating current density versus potential for different electrode materials.

In accordance with the invention, it has been found that silver, gold and copper are all electrochemically active as surfaces for the rapid electrochemical oxidation of chromous ions, and at the same time, are less subject to being electrochemically oxidized than lead. FIG. 3 graphically illustrates the current density versus potential for silver, copper and smooth carbon surfaces. As shown, at an electrode potential of $-550$ mv versus a saturated calomel electrode the rate of electrochemical oxidation of a chromous ion is less than 0.1 ma/cm$^2$. Under the same conditions, the current silver surface is about 9 ma/cm$^2$ which is about 90-fold increase. A copper surface under the same conditions yields 5 ma/cm$^2$ which is a 50-fold increase over a smooth carbon surface.

Referring now to FIG. 1, there is shown a catalytic metal layer or coating 16 on the inert electrode 15. The catalytic coating 16 is selected from the group of metals consisting of silver, gold and copper and may be applied to the electrode 15 by various procedures such as electrodeposition, metal spraying, dipping or the like. Over the catalytic layer 16 there is provided a layer of lead 17. The lead may be coated over the catalytic layer 16 before the electrode 15 is disposed in the chamber 12. As indicated previously, however, the lead layer 17 may be plated onto the catalytic coating 16 by adding lead chloride to the anode fluid before charging the REDOX cell.

Figure 4:
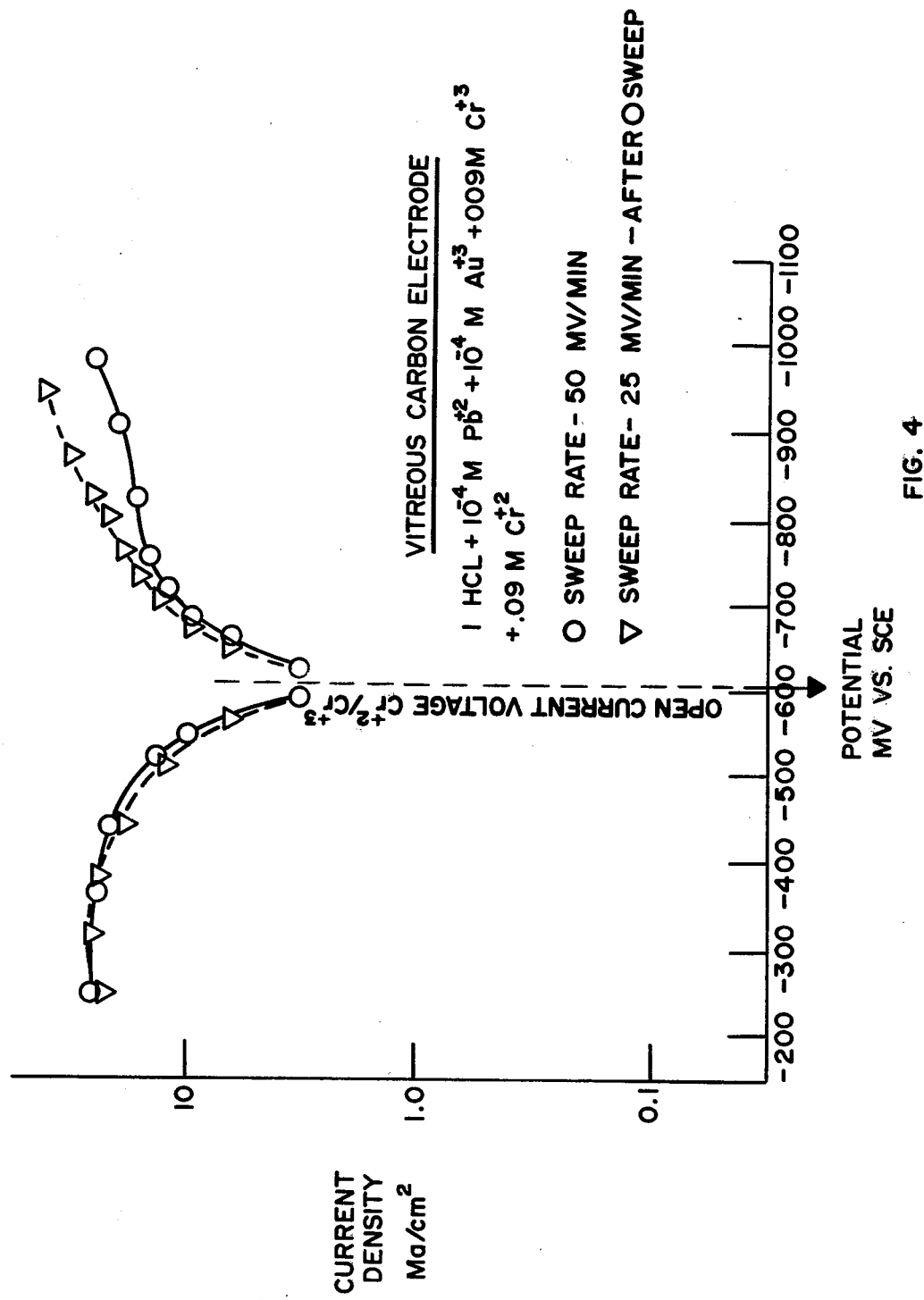
FIG. 4 illustrates current density versus potential for a carbon electrode with a catalytic coating and utilizing desired ions in the fluid to plate out on the coated electrode.

Referring now to FIG. 4, there is graphically shown the current density obtained for various electrode potentials for the chromous/chromic couple where the anode electrode is coated with gold and wherein lead chloride is dissolved in the anode fluid to provide lead ions.

As indicated previously, the gold coating on the anode electrode permits the lead coating to deplate when the cell is being discharged without a significant loss of electrode activity for the electrochemical oxidation of the chromous ion.

While the invention has been described with respect to the REDOX cell using an anode fluid having a chromous/chromic couple and a cathode fluid having a ferrous/ferric couple, other couples may be used.

The anode fluid preferably contains water as a solvent having dissolved therein a chloride salt selected from the group consisting of titanium chloride and chromium chloride, whereby cations in a reduced state are produced. The cathode fluid preferably contains water as a solvent having dissolved therein in a chloride salt selected from the group consisting of iron chloride, vanadium chloride, and manganese chloride, whereby cations in an oxidized state are produced.

Both the anode and cathode fluids are acidified solutions between 1 and 4 molar.

Referring again to FIG. 4, with the gold coating on the anode electrode it will be seen at negative 550 mv. versus the saturated calomel electrode the current for the electro oxidation of chromous ion is 9 ma/cm$^2$. This is a 90-fold increase over a plain carbon electrode.

The plating or coating of silver, gold or copper on the inert electrode is very thin. The amount of metal in the coating is on the order of only a few molecular layers. A graphite felt was produced with 25 micrograms of gold per cm$^2$ of projected area. This provided suitable electrode performance during discharge. The lead coating which goes over the silver, gold or copper coating on the inert electrode, whether applied before the electrode is inserted in the anode chamber or by deposition from the anode fluid, can also be as thin as several monolayers, where a monolayer is one molecule in thickness.

The gold, silver and copper catalysts which enhance the oxidation of chromous ions during the discharge cycle may be dissolved in the anode solution as salts to provide in-situ activation of the anode electrode. They can also be incorporated into the negative carbon electrode by saturating the electrode with a salt solution of gold, silver or copper followed by heat treatment to dry it.

Although lead chloride salt has been discussed above, cadmium chloride can be substituted for the lead chloride. Furthermore, cadmium chloride can be used in combination with the lead chloride.

Cadmium chloride achieves the same results as lead chloride in increasing the catalytic activity of a carbon electrode for the reduction of chromic chloride with the simultaneous inhibition of hydrogen evolution.

It will be understood that changes and modifications may be made to the above described invention by those skilled in the art without departing from the spirit and scope of the invention as set forth in the claims appended hereto.

What is claimed is:

1. A REDOX cell having first and second chambers separated by an ion permeable membrane; an anode fluid in the first chamber; and
   a cathode fluid in the second chamber;
   an anode electrode in said first chamber, said electrode being electrically conductive but inert with respect to the anode fluid;
   a cathode electrode in said second chamber, said electrode being electrically conductive but inert with respect to the cathode fluid, said anode fluid having lead chloride salt dissolved therein whereby lead is plated onto the anode electrode when the cell is initially charged.

2. The REDOX cell of claim 1 wherein the lead ions in said anode fluid are in the amount of $10^{-4}$ M/liter of the fluid to $10^{-5}$ M/liter.

3. The REDOX cell of claim 1 wherein said anode and cathode electrodes are selected from the group of materials consisting of carbon and graphite.

4. The REDOX cell of claim 1 wherein said anode is coated with a thin layer of metal selected from the group consisting of silver, gold and copper to inhibit the oxidation of lead ions when the cell is being discharged.

5. The REDOX cell of claim 4 wherein said thin layer of metal is 2–5 monolayers thick and amounts to $10^{-4}$ to $10^{-5}$ M/liter of anode fluid.

6. A REDOX cell having first and second chambers separated by an ion permeable membrane;
   an anode fluid in the first chamber;
   a cathode fluid in the second chamber;
   an anode electrode in said first chamber, said electrode being electrically conductive but inert with respect to the anode fluid;
   a cathode electrode in said second chamber, said electrode being electrically conductive but inert with respect to the cathode fluid, said anode electrode having thereon a thin coating of lead.

7. The REDOX cell of claim 1 wherein said coating of lead is about 2–5 monolayers thick.

8. The REDOX cell of claim 7 wherein the amount of lead is $10^{-4}$ to $10^{-5}$ M/liter of anode fluid.

9. The REDOX cell of claim 6 wherein a coating selected from the group of metals consisting of silver, gold and copper is disposed between the anode electrode and the lead coating.

10. The REDOX cell of claim 4 wherein said coating disposed between the anode electrode and the lead coating is about 2–5 monolayers thick.

11. A REDOX cell having first and second chambers separated by an ion permeable membrane; an anode fluid in the first chamber; and
    a cathode fluid in the second chamber;
    an anode electrode in said first chamber, said electrode being electrically conductive but inert with respect to the anode fluid;
    a cathode electrode in said second chamber, said electrode being electrically conductive but inert with respect to the cathode fluid, said anode fluid having cadmium salt dissolved therein whereby cadmium is plated onto the anode electrode when the cell is initially charged.

12. A REDOX cell having first and second chambers separated by an ion permeable membrane;
    an anode fluid in the first chamber;
    a cathode fluid in the second chamber;
    an anode electrode in said first chamber, said electrode being electrically conductive but inert with respect to the anode fluid;
    a cathode electrode in said second chamber, said electrode being electrically conductive but inert with respect to the cathode fluid, said anode electrode having thereon a thin coating of cadmium.

13. The REDOX cell of claim 12 wherein said coating of cadmium is about 2–5 monolayers thick.

14. A REDOX cell having first and second chambers separated by an ion permeable membrane; an anode fluid in the first chamber; and
    a cathode fluid in the second chamber;
    an anode electrode in said first chamber, said electrode being electrically conductive but inert with respect to the anode fluid;
    a cathode electrode in said second chamber, said electrode being electrically conductive but inert with respect to the cathode fluid, said anode fluid having dissolved therein more than one salt selected from the group consisting of lead chloride and cadmium chloride.

* * * * *